US012804123B2

(12) United States Patent
Yamamoto

(10) Patent No.: US 12,804,123 B2
(45) Date of Patent: Nov. 17, 2026

(54) HEAD-MOUNTED DISPLAY AND METHOD FOR CONTROLLING HEAD-MOUNTED DISPLAY

(71) Applicant: CANON KABUSHIKI KAISHA, Tokyo (JP)

(72) Inventor: Jun Yamamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 208 days.

(21) Appl. No.: 18/764,430

(22) Filed: Jul. 5, 2024

(65) Prior Publication Data

US 2025/0039353 A1 Jan. 30, 2025

(30) Foreign Application Priority Data

Jul. 24, 2023 (JP) ................................ 2023-119770

(51) Int. Cl.
*H04N 13/383* (2018.01)
*G06F 3/01* (2006.01)
*H04N 13/398* (2018.01)

(52) U.S. Cl.
CPC ........... *H04N 13/383* (2018.05); *G06F 3/016* (2013.01); *H04N 13/398* (2018.05)

(58) Field of Classification Search
CPC ..... H04N 13/383; H04N 13/398; G06F 3/016
See application file for complete search history.

(56) References Cited

U.S. PATENT DOCUMENTS

2008/0218515 A1* 9/2008 Fukushima .......... H04N 13/398 345/424
2015/0338915 A1* 11/2015 Publicover ......... G02B 27/0093 345/633
2018/0224926 A1* 8/2018 Harviainen ............. G06F 3/016
2019/0025916 A1* 1/2019 Okumura .............. A63F 13/285
2020/0033948 A1 1/2020 Ueshima
2021/0216132 A1* 7/2021 Dean ..................... A63F 13/218
2021/0255485 A1* 8/2021 Xu .......................... G06F 3/011

FOREIGN PATENT DOCUMENTS

JP 2015-215894 A 12/2015
JP 2019-207649 A 12/2019

* cited by examiner

*Primary Examiner* — Sunghyoun Park
(74) *Attorney, Agent, or Firm* — Carter, DeLuca & Farrell LLP

(57) ABSTRACT

A head-mounted display includes one or more processors and/or circuitry configured to: execute acquisition processing to acquire information on motion of a user, and execute control processing to control to reproduce tactile sensation with a second virtual object, which is a virtual operation body that exerts action on a first virtual object specified by the user, and is selected based on the information on the motion of the user.

16 Claims, 10 Drawing Sheets

HEAD-MOUNTED DISPLAY AND METHOD FOR CONTROLLING HEAD-MOUNTED DISPLAY

BACKGROUND OF THE INVENTION

Field of the Invention

The present invention relates to a head-mounted display, and a method for controlling the head-mounted display.

Description of the Related Art

Some head-mounted displays using techniques of mixed reality (MR), augmented reality (AR), virtual reality (VR), and the like have a haptic feedback function. The haptic feedback function is a function to provide a user tactile sensation with a virtual object disposed in a virtual space when the user touches the virtual object with a hand or a finder. By this haptic feedback function, when operating a virtual object, the user can experience a sensation as if a real object were being handled.

In a case where a plurality of virtual objects exist, a virtual object with which tactile sensation is provided is determined based on the line-of-sight information of the user, for example. Japanese Patent Application Publication No. 2015-215894 discloses a technique to provide haptic feedback, where in a case where a user is operating virtual objects, a haptic effect with an object the user is concentrating their attention on is given.

However, a virtual object the user is gazing at is not always a virtual object that user wants to operate. In some cases, the user may be attempting to grasp or operate an object without viewing it, while directing their line-of-sight to another object. If priority is assigned to the tactile effect with a virtual object the user is gazing at, instead of the virtual object the user attempts to grasp, the user may be confused.

SUMMARY OF THE INVENTION

The present invention provides a head-mounted display which accurately selects a virtual object the user attempts to grasp or operate, and provides a tactile sensation with the selected virtual object to the user.

A head-mounted display according to the present invention includes one or more processors and/or circuitry configured to: execute acquisition processing to acquire information on motion of a user; and execute control processing to control to reproduce tactile sensation with a second virtual object, which is a virtual operation body that exerts action on a first virtual object specified by the user, and is selected based on the information on the motion of the user.

Further features of the present invention will become apparent from the following description of exemplary embodiments with reference to the attached drawings.

DESCRIPTION OF THE EMBODIMENTS

Embodiments of a head-mounted display according to the present invention will now be described with reference to the drawings.

Embodiment 1

A head-mounted display according to Embodiment 1 detects a virtual object a user is interested in, and from candidates of a virtual object that exerts action on this virtual object, selects a virtual object the user attempts to operate based on information on motion (gesture) of the user. The head-mounted display includes a haptic feedback function, and reproduces tactile sensation with the selected virtual object. The head-mounted display can provide the user with the tactile effect with the virtual object the user attempts to operate.

Figure 1A:
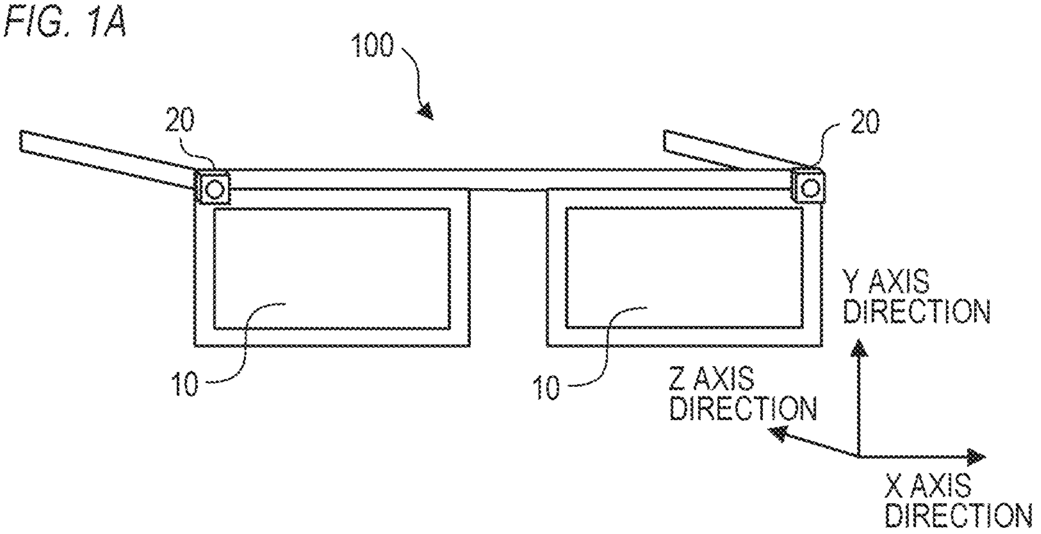
FIGS. 1A and 1B are external views of the head-mounted display.
Figure 1B:
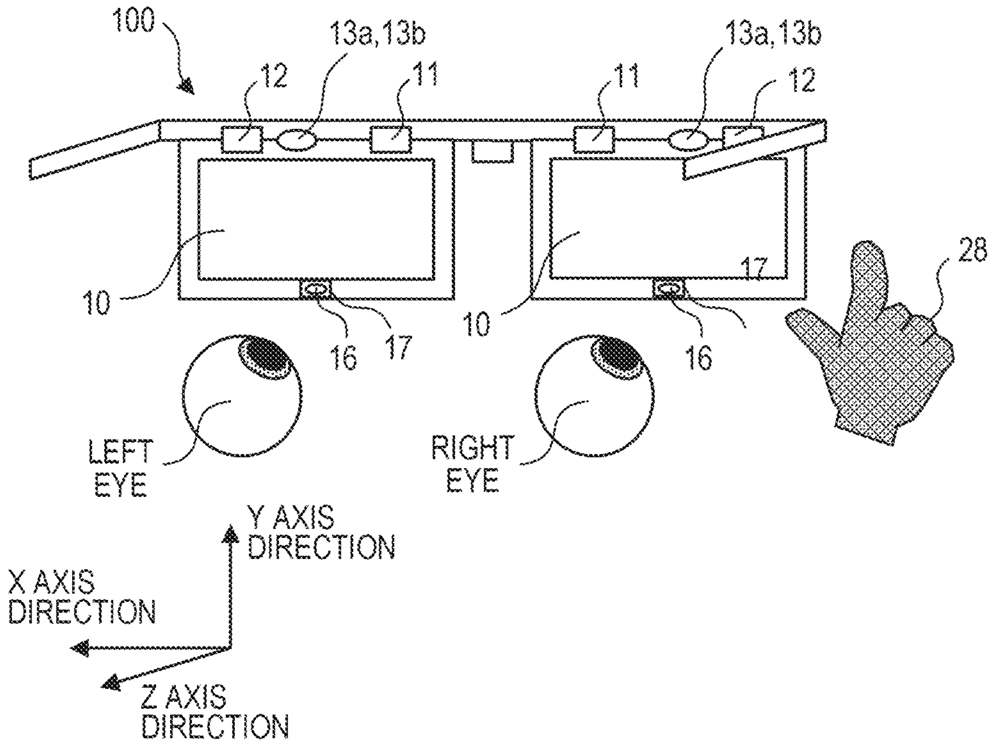

<Description on Configuration> FIGS. 1A and 1B are external views of a head-mounted display 100 according to Embodiment 1. The head-mounted display 100 includes a haptic feedback function. In the description here, the head-mounted display 100 is assumed to be an optical see-through type head-mounted display (HMD) for MR. FIG. 1A is a front perspective view, and FIG. 1B is a rear perspective view.

Lenses 10 are optical members opposing (facing) the eyes of the user. The user can view the outer world through the lenses 10. Display devices 11 are display elements to display virtual objects based on the later mentioned control (display control) received from a CPU 2. On the visual fields of both eyes (right eye and left eye) of the user who views the outer world via the optical system (lenses 10), the display devices 11 superimpose and display virtual images (computer graphics, CG) of the virtual objects, which are digital information. The virtual objects include a graphical user interface (GUI), such as buttons and icons. The user can view the displayed virtual objects as if they were existing in the outer world. When a graphic is displayed, a positional relationship of a display position for the right eye and a display position for the left eye in the lateral direction (parallax) is adjusted, whereby the position of the CG in a depth direction (direction away from the user) in the view of the user can be adjusted.

In the optical see-through type, the user views a real space through the lenses 10 which are display surfaces. For example, each lens 10 includes a prism or a half mirror, and the corresponding display device 11 projects CG onto the lens 10. The display device 11 may project CG onto a retina of the user. The lens 10 may be a non-light shielding transmission type display which includes a display function (function of the display device 11). Th user views the real space through the display, and virtual objects are superimposed and displayed on the display (lens 10).

The head-mounted display 100 may be a video see-through type head-mounted display, which displays live view or recorded moving images captured by a later mentioned outer world imaging unit 20 directly or after processing, shielding light from the lenses 10. The head-mounted display 100 may also be a type of head-mounted display which displays a virtual space, such as VR.

Each light source drive circuit 12 drives light sources 13*a* and 13*b* respectively. Each of the light sources 13*a* and 13*b* is a light source to illuminate a corresponding eye of the user, and is an infrared light-emitting diode which emits infrared light, which the user does not sense, to the user. A part of the light, which is emitted from the light sources 13*a* and 13*b* and is reflected by the corresponding eye of the user, is collected to each eye imaging element 17 by a corresponding light-receiving lens 16. The eye imaging element 17 is an imaging sensor (imaging element) that images an eye of the user. The imaging sensor is a charge coupled device (CCD) sensor or a complementary metal oxide semiconductor (CMOS) sensor, for example.

The lens 10, the display device 11, the light source drive circuit 12, the light sources 13*a* and 13*b*, the light-receiving lens 16 and the eye imaging element 17 are disposed for the right eye and the left eye respectively. The line-of-sight information of the user can be acquired using the light source drive circuit 12, the light sources 13*a* and 13*b*, the light-receiving lens 16 and the eye imaging element 17. The line-of-sight information is information on the line-of-sight, and indicates at least one of a viewpoint, a line-of-sight direction (direction of the line-of-sight), and a convergence angle (angle formed by the line-of-sight of the right eye and the line-of-sight of the left eye), for example. The viewpoint may be regarded as a position at which the line-of-sight is directed, or a position the user is gazing at, or a line-of-sight position. The method for acquiring the line-of-sight information will be described later with reference to FIGS. 3 to 5.

Each of the outer world imaging units 20 includes an imaging sensor (imaging element) that images a scene of the outer world to which the user has turned to face. The outer world imaging unit 20 has various functions to acquire information on the outer world. The imaging sensor is a CCD sensor or a CMOS sensor, for example.

The outer world imaging unit 20 acquires information on the motion (gesture) of the user operating the GUI, for example. The information on the motion of the user may include information on the motion of the hand of the user, the motion of the fingers of the user, and the motion of a pointer held by the user. The outer world imaging unit 20 includes functions to detect and track the hand of the user, and to detect a predetermined motion of the hand of the user.

The predetermined motion of the hand of the user can be detected using various known techniques, such as hand tracking. For example, a motion of tapping a button of the GUI with a finger is linked with an operation of pressing the button, then the user can perform a gesture operation (operation by gesture) on this button.

The outer world imaging unit 20 includes a function to detect a distance from the head-mounted display 100 to a real object existing in the outer world. The outer world imaging unit 20 can acquire information on the distance (distance information) from the head-mounted display 100 to the real object. By detecting the depth information of the hand of the user, the outer world imaging unit 20 can accurately recognize the relationship between the position of the hand of the user and the position of the virtual object disposed in the virtual space.

The function to detect the distance can be implemented using a known technique. For example, the outer world imaging unit 20 may use a method of emitting a light wave, such as a laser beam and a light-emitting diode (LED) light, to an object, and measuring the time it takes for this light wave to be reflected by the object and returned to the emitting-point. Instead of a light wave, a sound wave or a radio wave may be used. The outer world imaging unit 20 may use a distance measurement sensor that is different from the imaging sensor. The distance measurement sensor is, for example, a light detection and ranging (LiDAR) sensor which uses a laser beam, or a time of flight (TOF) sensor which uses an LED light. The outer world imaging unit 20 may use a method of calculating a distance using an image capturing the outer world. For example, the outer world imaging unit 20 may calculate the distance from an image captured by a stereo camera, which measures a distance using two cameras. Further, the outer world imaging unit 20 may use phase difference auto focus (AF), which is a method of measuring a distance using a plurality of different pixels (a plurality of photoelectric conversion elements) existing in an imaging plane of the imaging sensor. In Embodiment 1, phase difference AF is used.

A haptic feedback device 28 reproduces tactile sensation with a virtual object the user is operating, so as to provide tactile sensation with the virtual object the user is operating to a part of the body (e.g. hand, finger) of the user performing the operation. By feedback of the tactile sensation with the virtual object the user is operating, the user can experience a sensation as if a real object were being handled in the virtual space.

The haptic feedback device 28 may be a device based on a known technique. The haptic feedback device 28 includes an encounter type device where a tactile sensation providing device moves in accordance with the position of the hand of the user, a grip type device where the user grasps a movable object having a tactile sensation providing function, and a wearable type device where the user wears a glove having a tactile sensation providing function.

The method of the haptic feedback may be a method using a known technique. For example, the method of the haptic feedback is reproducing tactile sensation by providing vibration using a motor or actuator. The method of the haptic feedback may also be a method using air, fluid or ultrasound. Further, the method of the haptic feedback may be a method of using electric stimulation to a body within a technical range in which safety is confirmed, such as electrical muscle stimulation (EMS).

Figure 2:
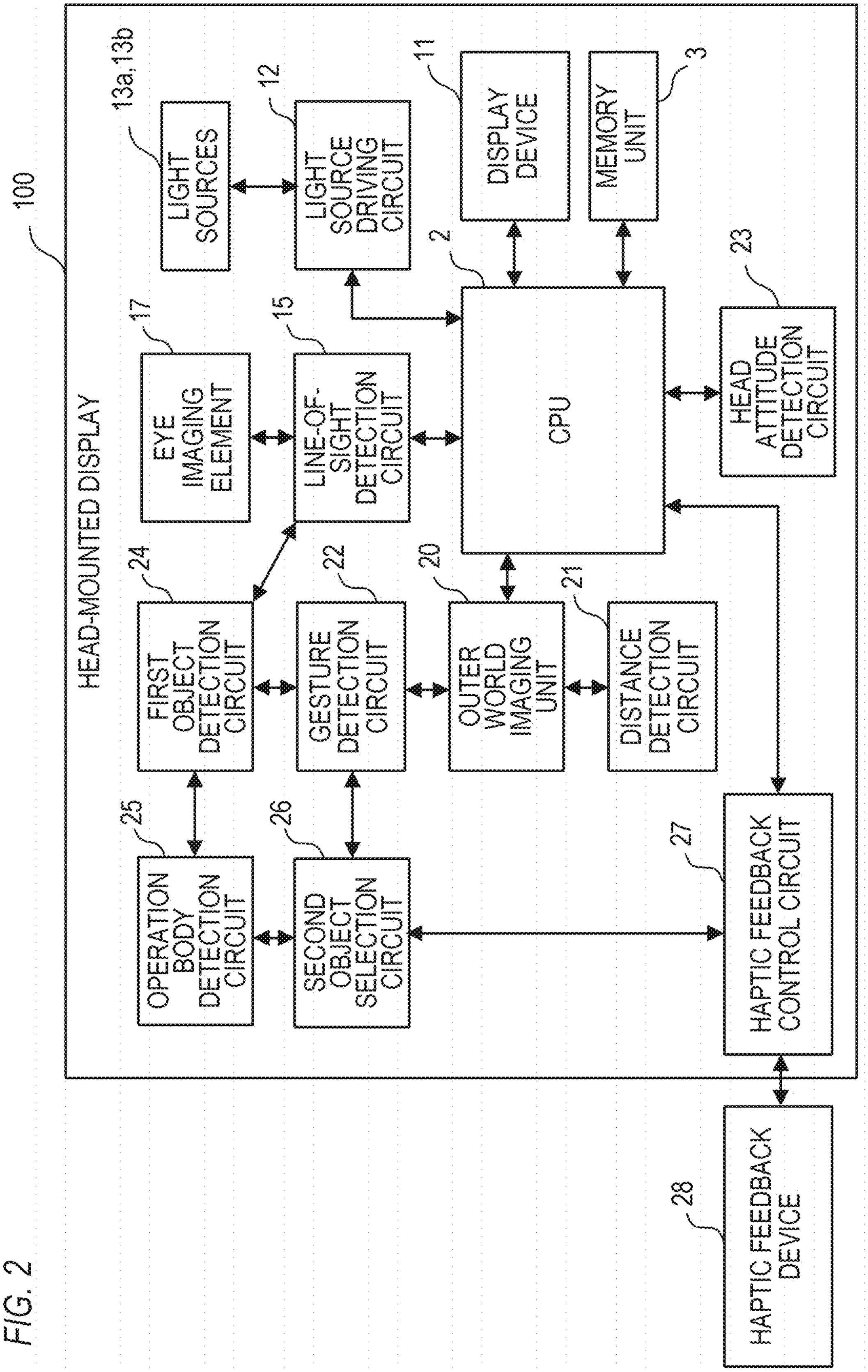
FIG. 2 is a block diagram of the head-mounted display.

FIG. 2 is a block diagram depicting an electric configuration of the head-mounted display 100. In FIG. 2, a composing element corresponding to a composing element indicated in FIGS. 1A and 1B is denoted with a same reference number, and detailed description thereof will be omitted. A CPU 2 is a central processing unit of a micro-computer included in the head-mounted display 100, and controls the head-mounted display 100 in general. The head-mounted display 100 includes a memory unit 3, the display device 11, the light source drive circuit 12, a line-of-sight detection circuit 15, the outer world imaging unit 20, a head attitude detection circuit 23, and a haptic feedback control circuit 27, and these composing elements are connected to the CPU 2. The head-mounted display 100 also includes the light sources 13*a* and 13*b*, the eye imaging elements 17, a distance detection circuit 21, a gesture detection circuit 22, a first object detection circuit 24, an operation body detection circuit 25, and a second object selection circuit 26. The head-mounted display 100 is connected to the haptic feedback device 28.

The memory unit 3 includes a storage function to store data sent from each composing element, such as video signals from the eye imaging element 17. The data stored in the memory unit 3 can be sent to each composing element via the CPU 2.

The line-of-sight detection circuit 15 is a digital serial interface circuit, and A/D-converts the output of the eye imaging element 17 (eye image capturing an eye) in a state where an optical image of the eye is formed on the eye imaging element 17, and sends the result thereof to the CPU 2. The CPU 2 extracts the feature points used for detecting the line-of-sight from an eye image in accordance with a predetermined algorithm, and detects the line-of-sight of the user based on the positions of the feature points. The CPU 2 can specify (detect) a virtual object the user is viewing based on the line-of-sight detection result (line-of-sight information).

The distance detection circuit 21 A/D-converts signals (voltage) from a plurality of pixels (plurality of photoelectric conversion elements) to detect phase difference, included in the imaging sensor of the outer world imaging unit 20, for example, and sends the result to the CPU 2. Using the signals from the plurality of pixels, the CPU 2 calculates a distance to a real object (subject) corresponding to each distance detection point.

The gesture detection circuit 22 detects and tracks the motion (gesture) of the user based on an image acquired by the outer world imaging unit 20 (image capturing the outer world), and sends the acquired information on the motion of the user to the CPU 2. The CPU 2 determines whether the gesture of the user is a predetermined motion, and if it is a predetermined motion, the CPU 2 executes processing linked with the predetermined motion.

The head attitude detection circuit 23 includes an acceleration sensor, for example, and sends a detection signal of the acceleration sensor to the CPU 2. The CPU 2 analyzes the detection signal, and detects the attitude (e.g. inclination degree) of the head of the user when the signal was detected. The change of the attitude of the head can be regarded as a change of the visual field direction in a coordinate system of the real space (world coordinate system). Based on the detection result of the attitude of the head, the CPU 2 can change the display position of the GUI so as to synchronize with the change of the visual field direction.

The first object detection circuit 24 is a circuit to detect (select) a virtual object the user is interested in. The virtual object that the user is interested in is a virtual object which the user has an intention to exert action on using another virtual object. The virtual object that the user is interested in is hereafter also called a "first virtual object". The other virtual object that exerts action on the first virtual object is also called a "virtual operation body". The first virtual object is correlated with at least one virtual operation body. By using any of the virtual operation bodies, the user can exert action on the first virtual object.

The first object detection circuit 24 can detect a first virtual object that the user is interested in, based on line-of-sight information of the user, for example. The first object detection circuit 24 may detect a first virtual object based on operation of a hand or a finger of the user pointing to the virtual object, or based on operation of the user which specifies the virtual object using a controller for operating the head-mounted display 100. The user can specify the first virtual object of interest by the line-of-sight, the hand or finger of the user, or by using the controller. In the following description, it is assumed that the user specifies the first virtual object by the line-of-sight.

The operation body detection circuit 25 detects another virtual object (virtual operation body) that can exert action on a first virtual object. The operation body detection circuit 25 acquires candidates of the virtual operation body which have been correlated with the first virtual object.

For example, in a case where the first virtual object that the user is interested in is a "screw", the operation body detection circuit 25 acquires, as candidates of the virtual operation body, virtual objects of a tool to turn the "screw", such as a "driver" and an "electric driver". If there are a plurality of "drivers" having different tip shapes and sizes, the operation body detection circuit 25 may acquire, as the candidates, only "drivers" which conform to the head shape and size of the "screw". Whether the shape and size conform to those of a virtual operation body may be determined in advance, or may be determined by image analysis.

The relationship between a first virtual object that the user is interested in and virtual operation bodies that exert action on the first virtual object may be defined in advance, or may be updated based on the operation state. For example, for a virtual operation body which has not been used to operate the first virtual object for a predetermined period, the relationship with the first virtual object may be cancelled.

For the candidates of the virtual operation body that exerts action on the first virtual object, the operation body detection circuit 25 may acquire virtual objects disposed in a predetermined distance range from the user. Further, the operation body detection circuit 25 may acquire candidates of the virtual operation body based on various conditions (e.g. distance from the first virtual object) instead of the distance from the user.

The second object selection circuit 26 selects a virtual object which the user attempts to grasp or operate (hereafter also called "second virtual object") based on the information on motion of the user. First the second object selection circuit 26 acquires information on motion (gesture information) when the user attempts to grasp or operate the virtual operation body that exerts action on the first virtual object. The gesture information may be acquired by the gesture detection circuit 22. The second object selection circuit 26 searches among the acquired candidates of the virtual operation body if acquired by the operation body detection circuit 25, and determines whether there is a virtual object conforming to the gesture information. If there is a virtual object conforming to the gesture information of the user, the second object selection circuit 26 selects (determines) this virtual object as the second virtual object.

For example, in a case where the first virtual object is a "screw", and candidates of the virtual operation body that exerts action on the first virtual object are a "driver" and an "electric driver", the second object selection circuit 26 selects one of the virtual operation bodies based on the gesture information. In a case where a diameter of a grip portion of the "electric driver" is larger than a diameter of a grip portion of the "driver", if the user makes a gesture attempting to grasp by opening their hand larger than the diameter of the grip portion of the "electric driver", then the "electric driver" is selected.

The haptic feedback control circuit 27 controls the haptic feedback device 28, and reproduces tactile sensation with the second virtual object selected by the second object selection circuit 26, and provides the tactile sensation to the hand, finger, or the like of the user. In a case where other virtual objects exist around the second virtual object, the haptic feedback control circuit 27 may control such that the tactile sensation with the second virtual object which the user grasps and operates is reproduced, and the tactile sensation with the other virtual objects around the second virtual object is not reproduced. On the other hand, the haptic feedback control circuit 27 may control such that the tactile sensation with the other virtual objects around the second virtual object is reproduced along with the tactile sensation with the second virtual object. In this case, the haptic feedback control circuit 27 may control with weighting such that the tactile sensation with the second virtual object to be reproduced becomes larger than the tactile sensation with the other virtual objects. The haptic feedback device 28 provides the tactile sensation with the second virtual object and the like to the user based on the instruction from the haptic feedback control circuit 27.

In the following example, the head-mounted display 100 detects the first virtual object that the user is interested in, based on the line-of-sight information. The head-mounted display 100 detects candidates of the virtual operation body that exerts action on the first virtual object, and selects a second virtual object to be operated, out of the candidates of the virtual operation body, based on the information on the motion of the user.

<Line-of-sight detection processing> Processing to acquire line-of-sight information by detecting the line-of-sight of the user will be described with reference to FIGS. 3 to 5. The line-of-sight of the right eye and the line-of-sight of the left eye can both be detected by the following line-of-sight detection method.

Figure 3:
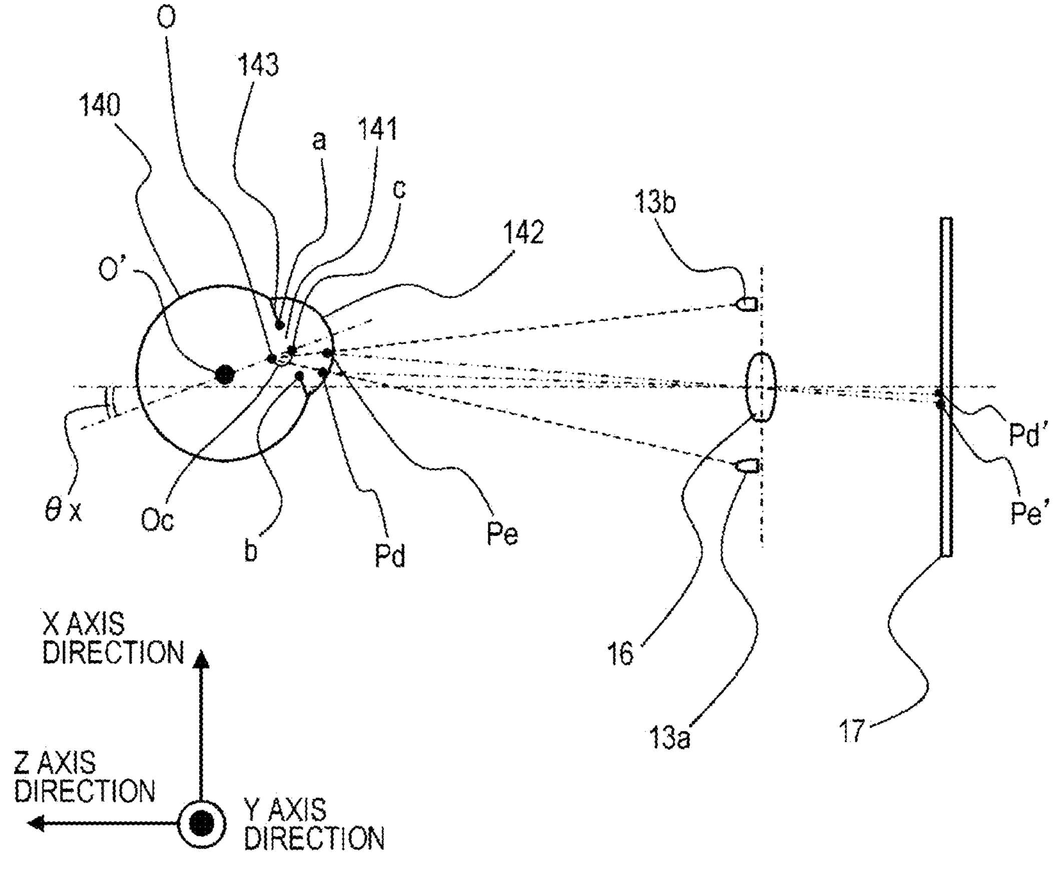
FIG. 3 is a diagram for explaining the principle of a line-of-sight detection method.

FIG. 3 is a diagram for describing the principle of the line-of-sight detection method, and is a schematic diagram of an optical system to detect the line-of-sight. As illustrated in FIG. 3, the light sources 13*a* and 13*b* are light sources, such as light-emitting diodes, to emit infrared light, the user does not sense, to the user. The light sources 13*a* and 13*b* are disposed approximately symmetrically with respect to the optical axis of the light-receiving lens 16, and illuminate an eyeball 140 of the user. A part of the light emitted from the light sources 13*a* and 13*b* and reflected by the eyeball 140 is focused on the eye imaging element 17 by the light-receiving lens 16. The head-mounted display 100 includes the eye imaging element 17 for the left and right respectively, as illustrated in FIG. 1B, and acquires an left eye image and a right eye image respectively.

Figure 4A:
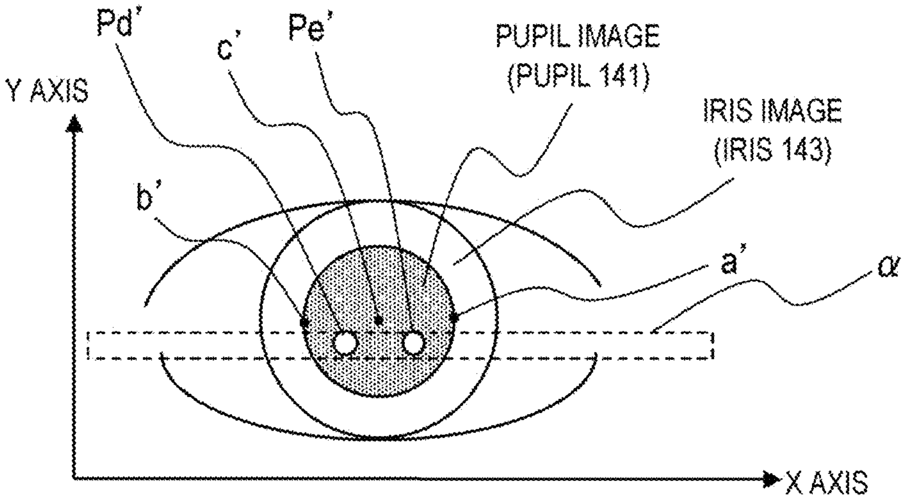
FIG. 4A is a schematic diagram of an eye image projected onto an eye imaging element.
Figure 4B:
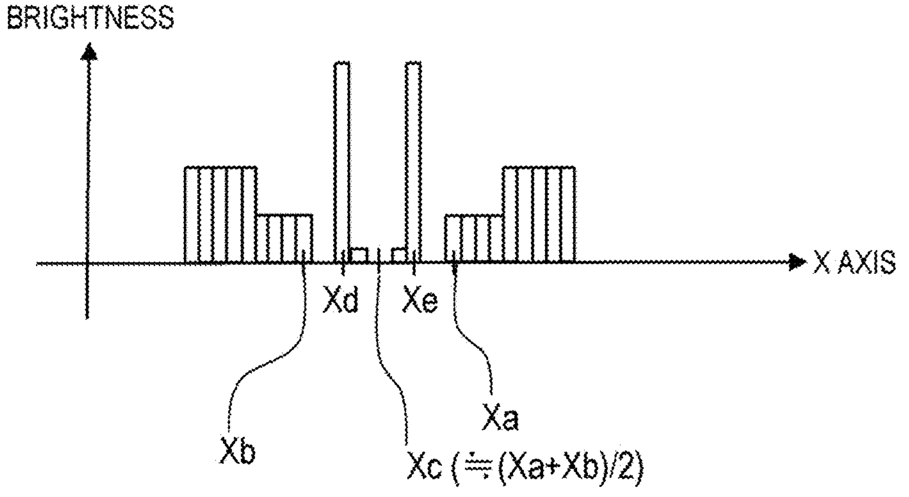
FIG. 4B is a diagram indicating an output intensity of CCD on the eye imaging element.

FIG. 4A is a schematic diagram of an eye image captured by the eye imaging element 17 (optical image projected onto the eye imaging element 17). FIG. 4B is a graph indicating an output intensity of CCD on the eye imaging element 17.

Figure 5:
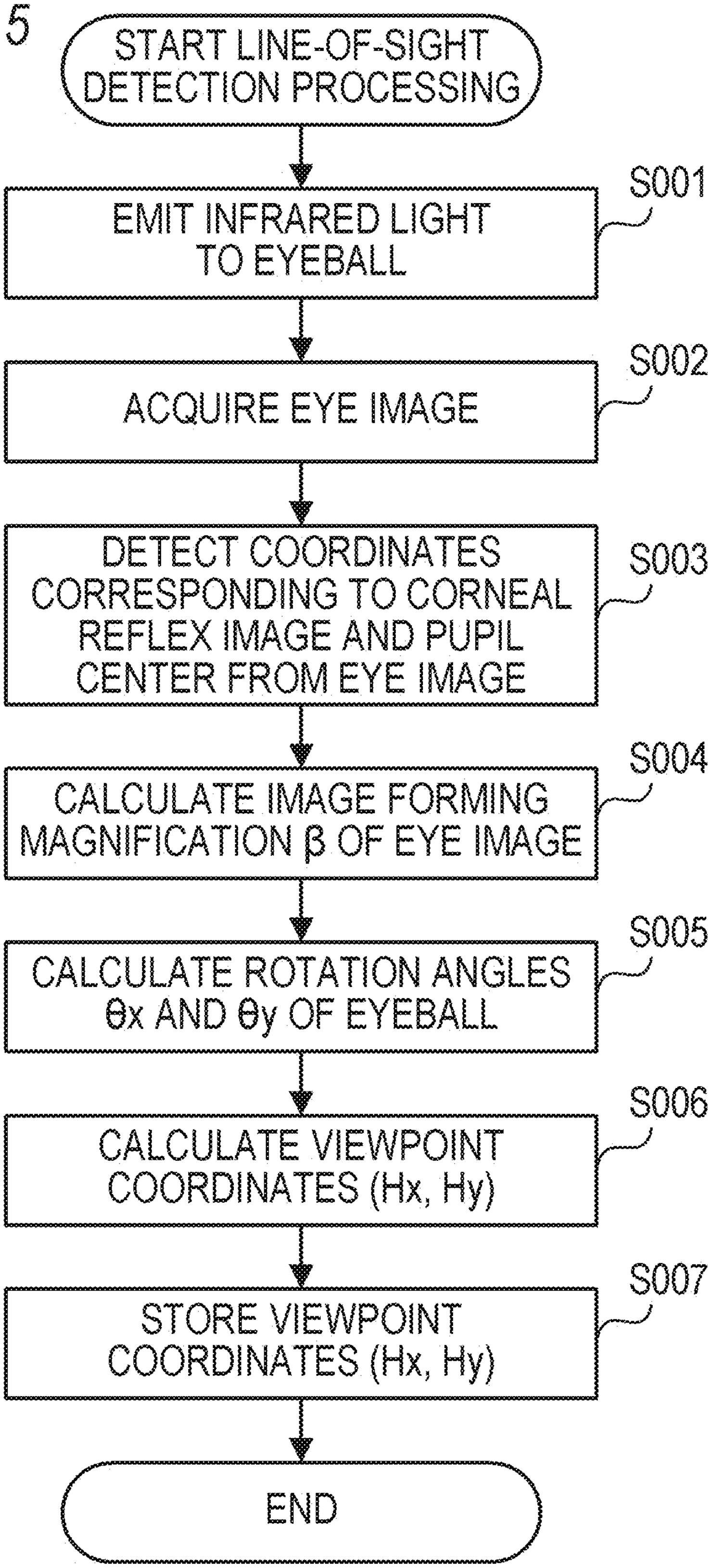
FIG. 5 is a flow chart exemplifying a line-of-sight detection processing.

FIG. 5 is a flow chart exemplifying the line-of-sight detection processing. When the line-of-sight detection processing starts, the light sources 13*a* and 13*b* emit infrared light toward the eyeball 140 of the user in step S001. An optical image of the eye of the user illuminated by the infrared light is formed on the eye imaging element 17 via the light-receiving lens 16, and is photoelectrically converted by the eye imaging element 17. Thereby a processable electric signal of the eye image is acquired. In step S002, the CPU 2 acquires the eye image (electric signal of the eye image; image data of the eye image) from the eye imaging element 17 via the line-of-sight detection circuit 15.

In step S003, from the eye image acquired in step S002, the CPU 2 determines the coordinates of the points corresponding to corneal reflex images Pd and Pe of the light sources 13*a* and 13*b* and the pupil center c indicated in FIG. 3. The infrared light emitted from the light sources 13*a* and 13*b* illuminates a cornea 142 of the eyeball 140 of the user. The corneal reflex images Pd and Pe formed by a part of the infrared light reflected on the surface of the cornea 142 is collected by the light-receiving lens 16, are imaged on the eye imaging element 17, and become corneal reflex images Pd' and Pe' on the eye image. In the same manner, the luminous fluxes from the edges a and b of the pupil 141 are imaged on the eye imaging element 17, and become pupil edge images a' and b' on the eye image.

FIG. 4A indicates an example of an eye image of a reflex image acquired from the eye imaging element 17. FIG. 4B indicates brightness information (brightness distribution) of a region a in the eye image in FIG. 4A. In FIG. 4B, it is assumed that the horizontal direction of the eye image is the X axis direction, and the virtual direction thereof is the Y axis direction. The coordinates of the corneal reflex images Pd' and Pe' in the X axis direction (horizontal direction) are Xd and Xe. The coordinates of the pupil edge images a' and b' in the X axis direction are Xa and Xb.

As indicated in FIG. 4B, an extremely high level of brightness is acquired at the coordinates Xd and Xe of the corneal reflex images Pd' and Pe'. In a region from the coordinates Xb to Xa, which corresponds to the region of the pupil 141 (region of the pupil image acquired when the luminous flux from the pupil 141 is imaged on the eye imaging element 17), an extremely low level of brightness is acquired, except for the portions of the coordinates Xd and Xe.

Whereas in a region of an iris 143 outside the pupil 141 (region of an iris image outside the pupil image, acquired when the luminous flux from the iris 143 is imaged), an intermediate brightness between the above mentioned two types of brightness levels is acquired. Specifically, brightness levels in a region of which X coordinate is smaller than Xb and a region of which X coordinate is larger than Xa become an intermediate brightness between the above mentioned two types of brightness levels.

Based on the brightness distribution indicated in FIG. 4B, the CPU 2 can acquire the X coordinates Xd and Xe of the corneal reflex images Pd' and Pe' and the X coordinates Xa and Xb of the pupil edge images a' and b'. Specifically, the CPU 2 can acquire the coordinates at which the brightness is extremely high as the coordinates of the corneal reflex images Pd' and Pe', and can acquire the coordinates at the boundaries at which the brightness is extremely low as the coordinates of the pupil edge images a' and b'.

In the case where a rotation angle $\theta x$ of the optical axis of the eyeball 140 from the optical axis of the light-receiving lens 16 is a predetermined angle or less, a coordinate Xc of the pupil center image c' (center of the pupil image), acquired when the luminous flux from the pupil center c is image on the eye imaging element 17, can be expressed by $Xc \approx (Xa+Xb)/2$. The predetermined angle can be determined, for example, to a value with which the corneal reflex images Pd' and Pe' are formed on the eye imaging element 17. The X coordinate Xc of the pupil center image c' can be calculated from the X coordinates Xa and Xb of the pupil edge images a' and b'. In this way, the CPU 2 can estimate the coordinates of the corneal reflex images Pd' and Pe' and the coordinate of the pupil center image c'.

In step S004, the CPU 2 calculates an image forming magnification $\beta$ of the eye image. The image forming magnification $\beta$ is a magnification determined by the position of the eyeball 140 with respect to the light-receiving lens 16, and can be determined as a function of the distance (Xd-Xe) between the corneal reflex images Pd' and Pe'.

In step S005, the CPU 2 acquires the rotation angle of the optical axis of the eyeball 140 from the optical axis of the light-receiving lens 16. The X coordinate of the middle point between the corneal reflex images Pd' and Pe' approximately matches with an X coordinate of a center of curvature O of the cornea 142. If the standard distance between the center of curvature O of the cornea 142 and the center c of the pupil 141 is Oc, then the rotation angle θx of the optical axis of the eyeball 140 on a Z-X plane (plane vertical to the Y axis) can be calculated using the following (Expression 1). The rotation angle θy of the eyeball 14 on the Z-Y plane (plane vertical to the X axis) can be calculated using the same method as for the rotation angle θx $$\beta \times Oc \times \mathrm{SIN}\theta x \approx \{(Xd + Xe)/2\} - Xc \quad \text{(Expression 1)}$$

In step S006, the CPU 2 acquires the line-of-sight position (hereafter also called a "viewpoint") of the user on the lens 10, using the rotation angles θx and θy calculated in step S005. If the coordinates (Hx, Hy) of the viewpoint are coordinates corresponding to the center c of the pupil 141 on the lens 10, then the coordinates (Hx, Hy) of the viewpoint can be calculated using the following (Expression 2) and (Expression 3).

$$Hx = m \times (Ax \times \theta x + Bx) \quad \text{(Expression 2)}$$

$$Hy = m \times (Ay \times \theta y + By) \quad \text{(Expression 3)}$$

The parameter m of (Expression 2) and (Expression 3) is a constant that is determined by the configuration of the optical system to perform the line-of-sight detection processing, and is a conversion coefficient to convert the rotation angles θx and Oy into coordinates corresponding to the center c of the pupil 141 on the lens 10. The parameter m is predetermined and stored in the memory unit 3 in advance. The line-of-sight correction coefficients Ax, Bx, Ay and By are parameters to correct an individual difference of the line-of-sight of the user, and are acquired by performing the calibration operation. The line-of-sight correction coefficients Ax, Bx, Ay and By are stored in the memory unit 3 before the line-of-sight detection processing is started.

In step S007, the CPU 2 stores the coordinates (Hx, Hy) of the viewpoint in the memory unit 3, and ends the line-of-sight detection processing. The processing in FIG. 5 is an example of acquiring the rotation angle of the eyeball using the corneal reflex images of the light sources 13*a* and 13*b*, and acquiring the coordinates of the viewpoint on the lens 10, but the present invention is not limited to this. The method for acquiring the rotation angle of the eyeball from the eye image may also be a method of measuring the line-of-sight based on the pupil center position. Further, the line-of-sight detection method may also be a method not using the eye image, as in the method of detecting the eye potential and detecting the line-of-sight based on this eye potential.

Figure 6A:
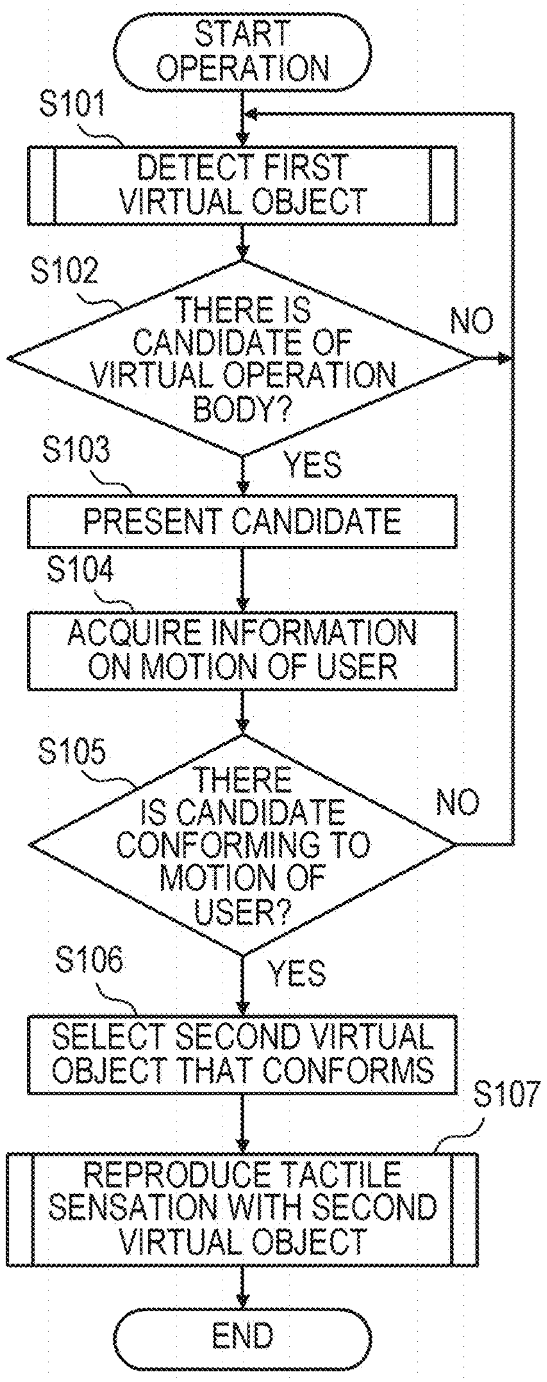
FIGS. 6A to 6C are flow charts exemplifying haptic feedback processing.
Figure 6B:
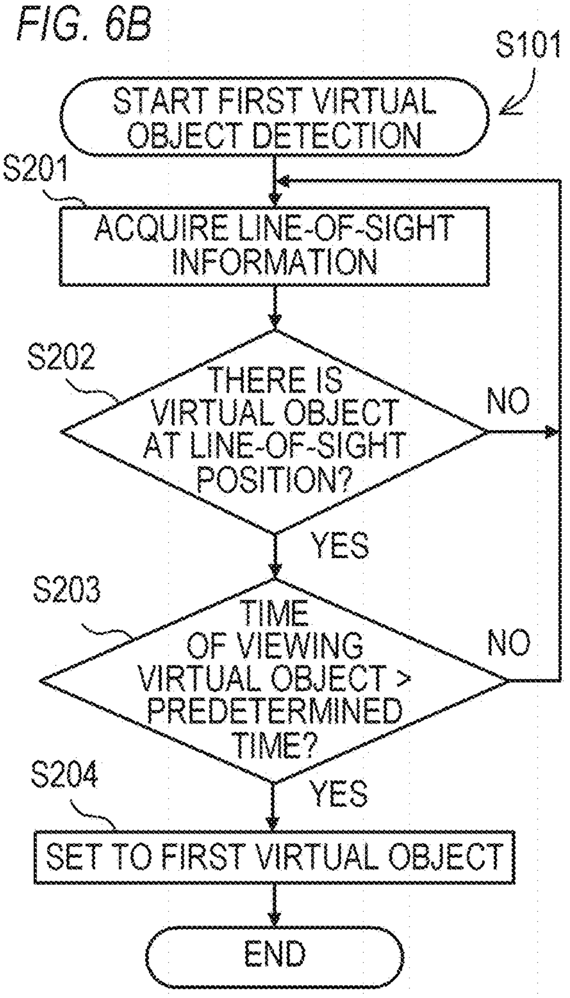
Figure 6C:
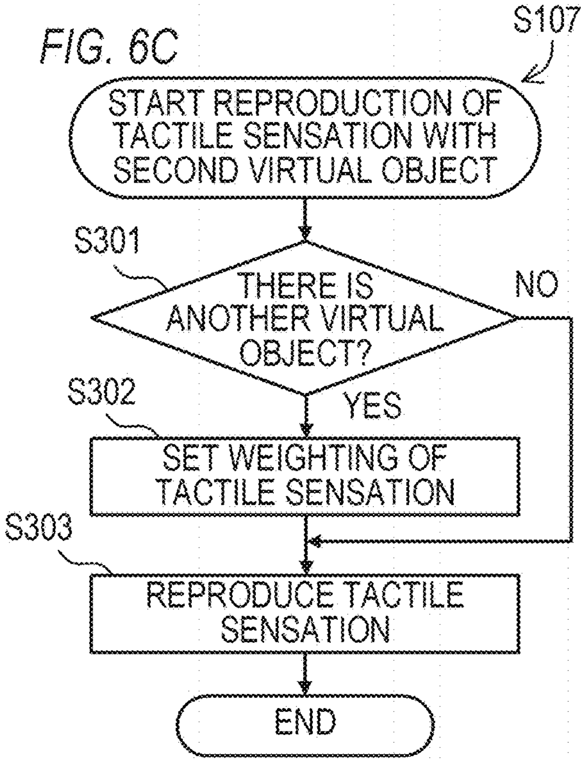

<Haptic feedback processing> FIGS. 6A to 6C are flow charts exemplifying a haptic feedback processing. The haptic feedback processing is a processing, from the user starting an operation to grasp or operate a second virtual object to exert action on a first virtual object, to the user receiving haptic feedback from the second virtual object. Even in a case of attempting to operate the second virtual object without viewing the object, the user can receive tactile sensation with the second virtual object, and can exert action of the second virtual object on the first virtual object.

FIG. 6A is a flow chart exemplifying the haptic feedback processing. FIG. 6B is a flow chart exemplifying details of the processing to detect the first virtual object, out of the haptic feedback processing. FIG. 6C is a flow chart exemplifying details of the processing to reproduce the tactile sensation with the second virtual object, out of the haptic feedback processing.

The processing steps in FIGS. 6A to 6C are executed in a state where the user wears the head-mounted display 100, and the head-mounted display 100 is started up. The initial setting, such as calibration to correct an individual difference of the line-of-sight, is performed before the processing in FIG. 6A is started. The processing in FIG. 6A is periodically executed at a predetermined cycle, for example, while the user is wearing the head-mounted display 100.

In step S101, the first object detection circuit 24 detects a first virtual object that the user is interested in. The first virtual object is specified by the user. For example, the user can specify the first virtual object by line-of-sight. In this case, the first object detection circuit 24 can detect a virtual object which exists at a line-of-sight position of the user detected by the line-of-sight detection circuit 15, as the first virtual object. The user can also specify the first virtual object using their hand or a controller. In this case, the first object detection circuit 24 can detect the virtual object specified by the user, as the first virtual object, based on the information on the motion of the user detected by the gesture detection circuit 22.

In step S102, the operation body detection circuit 25 determines if there is a candidate of a virtual operation body that can exert action on (can operate) the first virtual object detected in step S101. The virtual operation body has been stored in the memory unit 3 or the like as a virtual object pairing up with the first virtual object. The first virtual object can be linked with a plurality of operation bodies. The operation body detection circuit 25 searches virtual objects other than the first virtual object, and determines whether there is a candidate of the virtual objection body linked with the first virtual object. Processing advances to step S103 if there is a candidate of the virtual operation body. Processing returns to S101 if there is no candidate of the virtual operation body.

In step S103, if at least one candidate of the virtual operation member exists, the candidate of the virtual operation body is presented. The presentation here presents the virtual operation member that is disposed in the virtual space, and includes a case where the virtual operation body is outside the range of the visual field of the user.

In step S104, the gesture detection circuit 22 acquires information on the motion of the user (gesture information). The gesture information is information on the motion of the user who attempts to grasp the virtual operation body that exerts action on the first virtual object in a state where the user is interested in the first virtual object.

In step S105, the second object selection circuit 26 determines where there is a candidate of a virtual operation body that conforms to the motion of the user detected in step S104. In other words, the second object selection circuit 26 determines whether there is a candidate of a virtual operation body that can be grasped or operated by the detected motion (gesture) of the user. For example, by linking a virtual operation body with a gesture that can grasp or operate this virtual operation body and storing this data in advance, the second object selection circuit 26 can search a virtual operation body that conforms to the gesture of the user. Processing advances to step S106 if there is a candidate conforming to the motion of the user. Processing returns to step S106 if there is no candidate conforming to the motion of the user.

In step S106, the second object selection circuit 26 selects a candidate of the virtual operation body conforming to the motion of the user, as the second virtual object that the user attempts to operate. If there are a plurality of candidates of the virtual operation body conforming to the motion of the user, the second object selection circuit 26 may select a candidate, closest to the position of the hand of the user (position where the motion of the user was detected), as the second virtual object.

In step S107, the haptic feedback control circuit 27 controls the haptic feedback device 28 such that the tactile sensation with the second virtual object selected in step S106 is reproduced. The haptic feedback control circuit 27 can improve the operational feeling by providing the user the tactile sensation with the second virtual object.

FIG. 6B is a flow chart exemplifying details of the processing to detect a first virtual object that the user is interested in. In the example of FIG. 6B, the first object detection circuit 24 uses line-of-sight information of the user to select a first virtual object. For example, the first object detection circuit 24 can select the first virtual object based on the time during which the line-of-sight of the user is directed to the virtual object. Specifically, the first object detection circuit 24 can select a virtual object, to which the line-of-sight of the user is directed is longer than the predetermined time, as the first virtual object.

In step S201, the first object detection circuit 24 acquires the line-of-sight information of the user detected by the line-of-sight detection circuit 15. In step S202, the first object detection circuit 24 determines whether there is a virtual object at the line-of-sight position of the user. Processing advances to step S203 if there is a virtual object at the line-of-sight position of the user. Processing returns to step S201 if there is no virtual object at the line-of-sight position of the user.

In step S203, the first object detection circuit 24 measures time during which the user is viewing the virtual object, and determines whether the measured time is longer than a predetermined time. Processing advances to S204 if the time during which the user is viewing the virtual object is longer than the predetermined time. Processing returns to S201 if the time during which the user is viewing the virtual object is the predetermined time or less.

In step S204, the first object detection circuit 24 sets a virtual object, which the user is viewing, exceeding the predetermined time to the first virtual object that the user is interested in.

As the first virtual object, the first object detection circuit 24 may select a virtual object that exists at the line-of-sight position, regardless how long the user is viewing the virtual object. Further, the first object detection circuit 24 may set a virtual object, which the user specified by a method other than the line-of-sight, to the first virtual object. For example, the first object detection circuit 24 may set a virtual object specified by a hand or a finger of the user, or a virtual object specified by a controller to operate the head-mounted display 100, to the first virtual object.

FIG. 6C is a flow chart exemplifying details of the processing to reproduce a tactile sensation with the second virtual object. In the example of FIG. 6C, if there is another virtual object around the second virtual object, the haptic feedback control circuit 27 controls with weighting the intensity of the tactile sensation with the second virtual object, so as to be stronger than the intensity of the tactile sensation with the other virtual object, and reproduce the tactile sensation with the second virtual object thereby.

In step S301, the haptic feedback control circuit 27 determines whether there is a virtual object other than the first virtual object and the second virtual object. For example, the haptic feedback control circuit 27 can determine whether there is another virtual object based on the result of searching a virtual object by the first object detection circuit 24, the operation body detection circuit 25, and the second object selection circuit 26. Processing advances to step S302 if there is another virtual object. Processing advances to step S303 if there is no other virtual object.

In step S302, the haptic feedback control circuit 27 sets weighting such that the intensity of the tactile sensation with the second virtual object is outputted stronger than the tactile sensation with the other virtual objects. In step S303, the haptic feedback control circuit 27 controls to reproduce the tactile sensation with the second virtual object based on the weighting which is set in step S302.

In the case where there is a virtual object other than the second virtual object as well, the influence of the tactile sensation with the other virtual object may be reduced, so that the tactile sensation with the second virtual object can be appropriately provided to the user. The processing steps indicated in FIGS. 6A to 6C are examples, and the sequence of each step and the processing method may be changed when necessary as long as similar results can be obtained.

Figure 7:
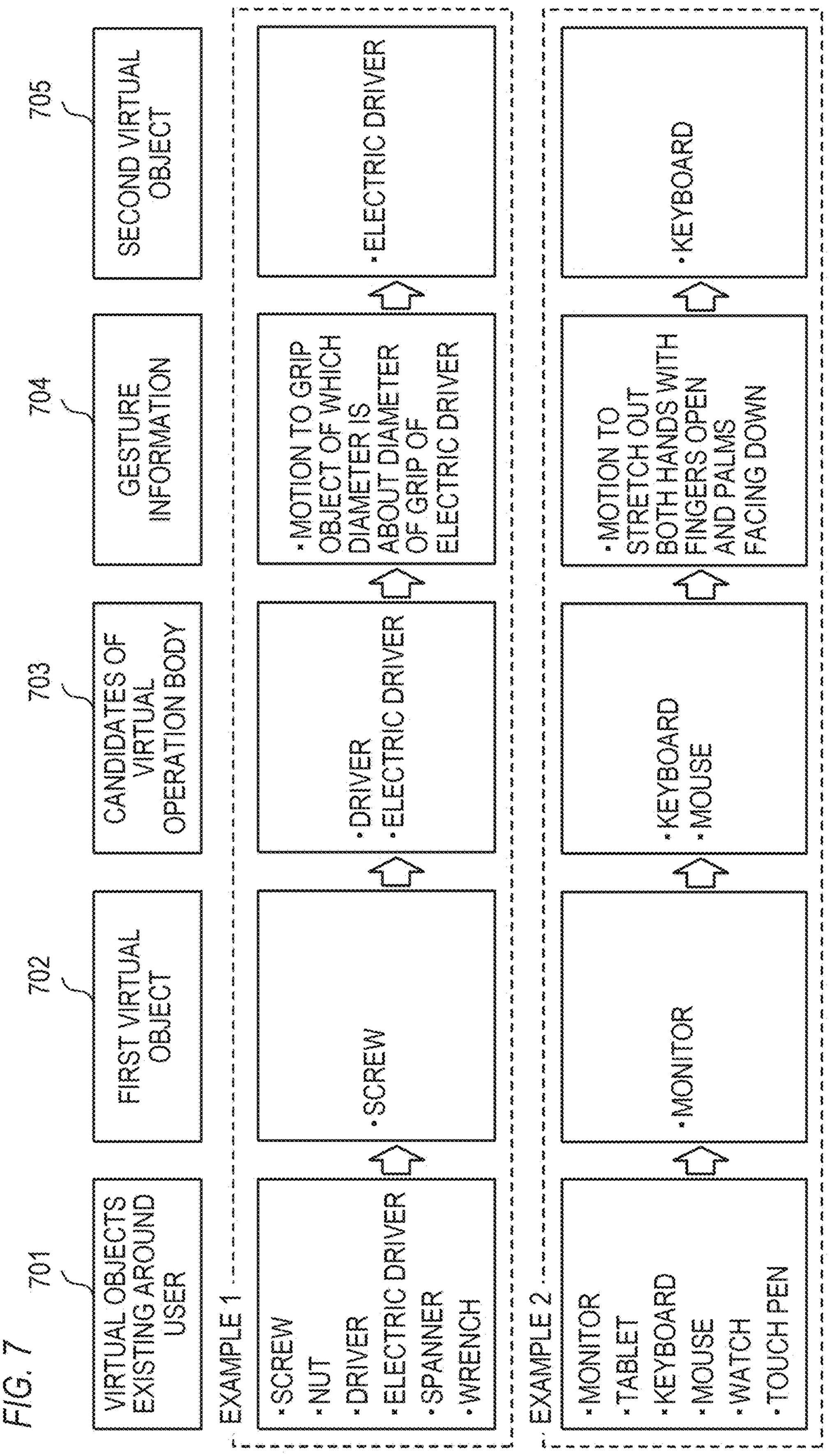
FIG. 7 is a diagram for explaining a concrete example of selecting a virtual object with which haptic sensation is reproduced.

FIG. 7 is a diagram for explaining a concrete example to select a second virtual object to reproduce the tactile sensation. Example 1 and Example 2 indicated in FIG. 7 are concrete examples of the steps to select a second virtual object out of the virtual objects existing around the user.

Example 1 on the upper row is a concrete example of a scene of tightening a screw with a driver. "Virtual objects existing around the user 701" here are a screw, a nut, a driver, an electric driver, a spanner and a wrench. "First virtual objects 702" is a virtual object that the user is interested in, detected by the first object detection circuit 24. "First virtual object 702" is specified by the user. For example, the user can specify "first virtual object 702" by directing their line-of-sight to the screw. In Example 1, the first object detection circuit 24 detects the screw specified by the user as the "first virtual object 702".

"Candidates of virtual operation body 703" indicates candidates of the virtual operation body that can exert action on "first virtual object 702". The screw, which is indicated in "first virtual object 702", is linked with the driver and the electric driver, which are virtual operation bodies that can exert action on the screw. The operation body detection circuit 25 presents the driver and the electric driver for "candidates of virtual operation body 703".

"Gesture information 704" is information on the motion of the user detected by the gesture detection circuit 22. "Gesture information 704" is information on the motion of the user who attempts to grasp or operate the second virtual object that exerts action on the first virtual object 702 which the user is interested in. In Example 1, "gesture information 704" is information on the motion of grasping an object having a diameter (thickness) similar to that of the grip of the electric driver. Here the user can present a motion to grip a virtual object thicker than the driver by opening their hand wider than the case of gripping the driver.

"Second virtual object 705" is information on the second virtual object detected based on "gesture information 704".

In Example 1, the second object selection circuit 26 specifies the electric driver as the second virtual object.

Example 2 on the lower row is a concrete example of a scene of operating a keyboard while viewing a monitor. "Virtual objects existing around the user 701" here are a monitor, a tablet, a keyboard, a mouse, a watch and a touch pane. In Example 2, the first object detection circuit 24 detects the monitor, specified by the user, for "first virtual object 702". The monitor, which is indicated in "First virtual object 702", is linked with the keyboard and the mouse, which are virtual operation bodies that can exert action on the monitor. The operation body detection circuit 25 presents the keyboard and the mouse for "candidates of virtual operation body 703".

In Example 2, "gesture information 704" is information on the motion to stretch out the user's hands with fingers open and palm facing down. In Example 2, the second object selection circuit 26 specifies the keyboard as the second virtual object based on "candidates of virtual operation body 703" that exerts action on the first virtual object, and "gesture information 704".

The haptic feedback control circuit 27 sets weighting such that the intensity of the tactile sensation with the second virtual object specified in Example 1 or Example 2 becomes stronger than the intensity of the tactile sensation with the other virtual objects, and provides the tactile sensation to the user. Thereby the user can sense the touch and operational feeling when gripping the second virtual object more strongly than the other virtual objects.

According to Embodiment 1, even in the case where the user attempts to grasp a virtual object without viewing it (without directing their line-of-sight to the virtual object), the head-mounted display 100 can improve selectivity of the virtual object that the user attempts to grasp or operate. Further, the head-mounted display 100 can improve operational feeling of the virtual object by providing the user tactile sensation with the virtual object that the user attempts to grasp or operation without viewing it.

Embodiment 2

A difference of Embodiment 2 from Embodiment 1 is the method for detecting (selecting) a first virtual object that the user is interested in. The configuration of the head-mounted display 100 and the method for line-of-sight detection of Embodiment 2 is the same as Embodiment 1.

Figure 8:
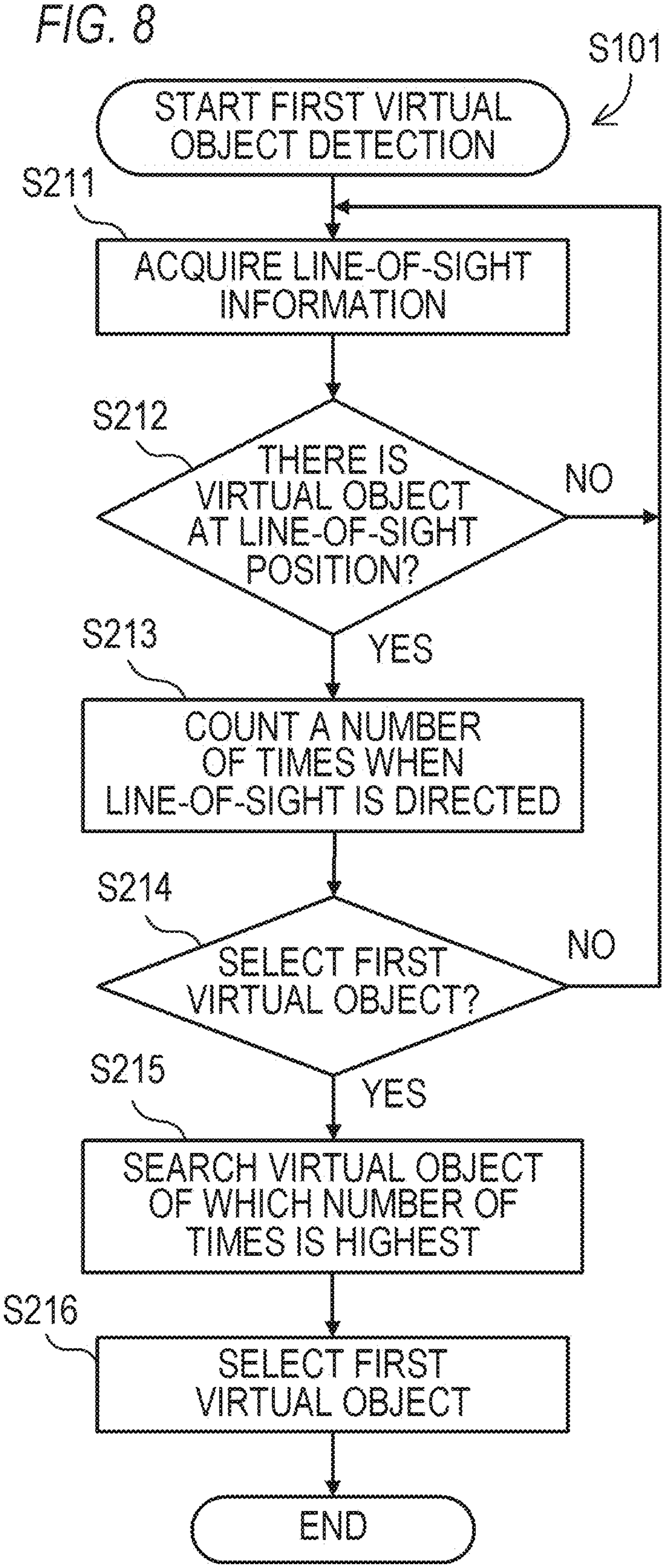
FIG. 8 is a flow chart exemplifying processing to detect a first virtual object according to Embodiment 2.

FIG. 8 is a flow chart exemplifying details of processing to detect a first virtual object that the user is interested in. The processing in FIG. 8 details the processing in step S101 in FIG. 6A, and indicates a concrete example that is different from FIG. 6B.

The first object detection circuit 24 selects a first virtual object using the line-of-sight information in the same manner as Embodiment 1. In Embodiment 2, the first object detection circuit 24 selects the first virtual object based not only on the line-of-sight position of the user, but also on the number of times the line-of-sight of the user is directed to the virtual object.

In step S211, the first object detection circuit 24 acquires the line-of-sight information of the user detected by the line-of-sight detection circuit 15. In step S212, the first object detection circuit 24 determines whether there is a virtual object at the line-of-sight position of the user. Processing advances to step S203 if there is a virtual object at the line-of-sight position of the user. Processing returns to step S201 is there is no virtual object at the line-of-sight position of the user.

In step S213, if there is a virtual object at the line-of-sight position, the first object detection circuit 24 counts a number of times the line-of-sight of the user is directed to this virtual object. If there are a plurality of virtual objects, the first object detection circuit 24 counts a number of times the line-of-sight of the user is directed to each of the virtual objects.

In step S214, the first object detection circuit 24 determines whether the first virtual object that the user is interested in is selected. For example, the first object detection circuit 24 can determine that the first virtual object is selected when a predetermined time elapsed since the first virtual object was selected the last time.

The first object detection circuit 24 may also determine that the first virtual object is selected in a case where there is a virtual object which the user directed the line-of-sight to for at least a predetermined number of times. In this case, in steps S215 and S216, the first object detection circuit 24 detects this virtual object which the user directed the line-of-sight to for at least a predetermined number of times, as the virtual object of which number of times the line-of-sight is directed is highest, and selects this virtual object as the first virtual object.

Further, in a case where an instruction by voice or an instruction by gesture is received from the user, the first object detection circuit 24 may determine that the first virtual object is selected. In this case, if the instruction is received from the user, the first object detection circuit 24 detects a virtual object of which number of times the line-of-sight of the user is directed is highest, and selects this virtual object as the first virtual object in steps S215 and S216.

Processing advances to step S215 if the first virtual object is selected. Processing returns to step S211 if the first virtual object is not selected. In the state where the user is viewing a plurality of virtual objects existing in the visual field, a number of times the line-of-sight of the user is directed is added for each virtual object. The processing steps S211 to S214 are periodically executed, so the number is added for each period even for a virtual object the user is gazing at.

In step S215, the first object detection circuit 24 searches a virtual object of which number of times the line-of-sight of the user is detected is highest within a predetermined time. As the number of times the line-of-sight of the user is directed is higher, it can be determined that the interest of the user in this virtual object is higher.

In step S216, the first object detection circuit 24 selects the virtual object of which number of times the line-of-sight of the user is directed is highest within the predetermined time, as the first virtual object that the user is interested in. When the first virtual object is detected (selected) in step S216, the number of times the line-of-sight of the user is directed to each virtual object may be initialized.

In Embodiment 2 described above, time-series information (a number of times the line-of-sight of the user is directed) is used to select a first virtual object that the user is interested in. Embodiment 2 is effective in a case where it is difficult for the user to view the first virtual object continuously. For example, Embodiment 2 is effective in a case where a first virtual object and a second virtual object that exerts action on the first virtual object are checked alternately, or a case where the user desires to direct the line-of-sight to a second virtual object to actually grasp the second virtual object. The processing steps in FIG. 8 are examples, and the sequence of each step and the processing method may be changed when necessary, as long as similar results can be obtained.

The first object detection circuit 24 may select a first virtual object using time-series information of gesture or instruction using the hand of the user, the finger of the user or controller instead of the line-of-sight.

According to Embodiment 2, the head-mounted display 100 selects the first virtual object that the user is interested in using time-series information, thereby even if the target specified by the user fluctuates, the first virtual object can be selected appropriately. Further, even in a case where the user attempts to grasp a virtual object without viewing it (without directing the line-of-sight), selectivity of a virtual object that the user attempts to grasp or operate can be improved.

Embodiment 3

A difference of Embodiment 3 from Embodiment 1 is the method for providing (reproducing) the tactile sensation with a second virtual object that exerts action on the first virtual object that the user is interested in. The configuration of the head-mounted display 100 and the method for line-of-sight detection of Embodiment 3 is the same as Embodiment 1.

Figure 9A:
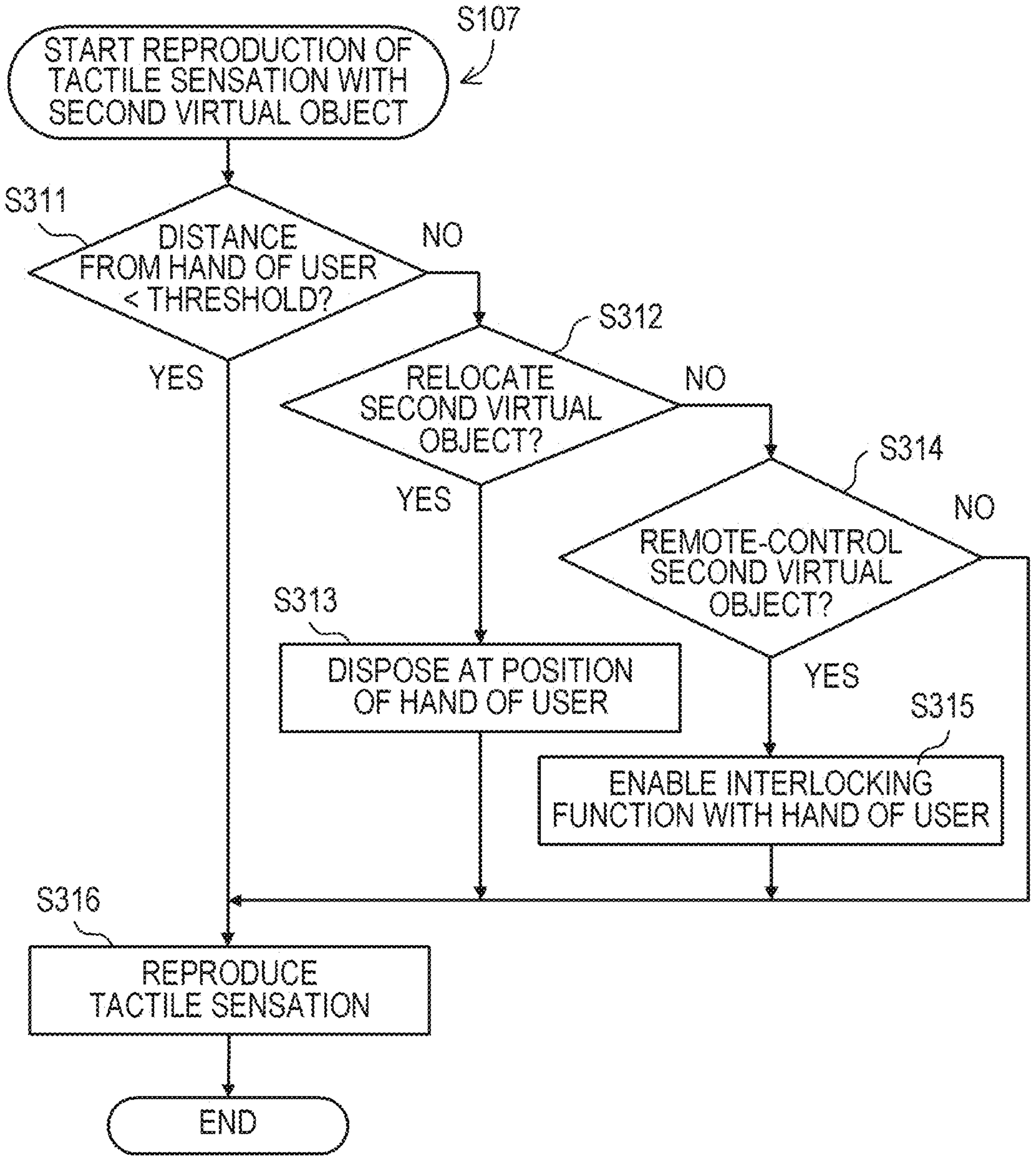
FIGS. 9A and 9B are flow charts exemplifying tactile reproduction processing according to Embodiment 3.
Figure 9B:
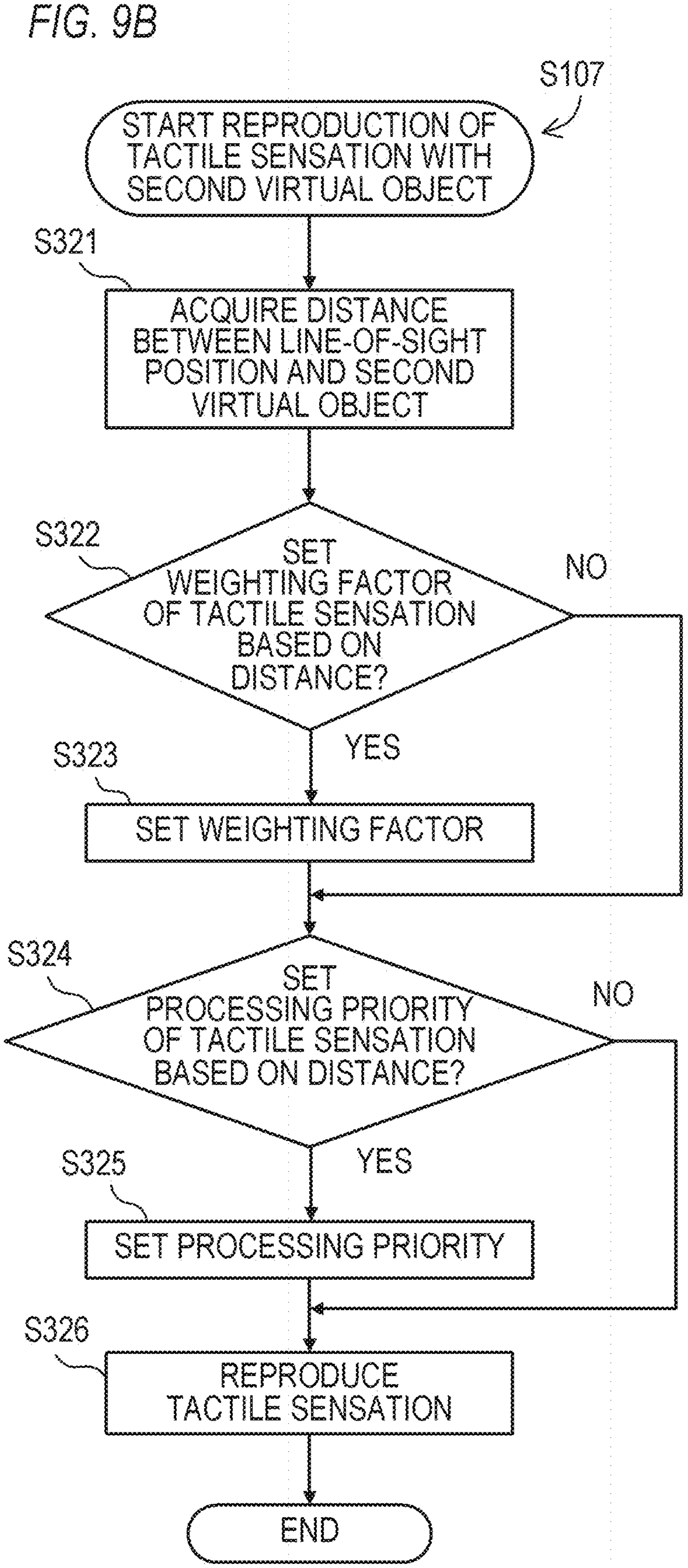

FIGS. 9A and 9B are flow charts exemplifying details of processing to reproduce tactile sensation with the second virtual object. The processing steps in FIGS. 9A and 9B detail the processing in step S107 in FIG. 6A respectively, and indicate concrete examples that are different from FIG. 6C. FIG. 9A is a flow chart exemplifying processing to control relocation of the second virtual object and remote operation based on the distance between the second virtual object and the hand. FIG. 9B is a flow chart exemplifying processing to perform weighting based on the distance between the second virtual object and the line-of-sight position, and reproduce the tactile sensation with the second virtual object.

In step S311 in FIG. 9A, the haptic feedback control circuit 27 determines whether the distance between the hand of the user operating the second virtual object and the second virtual object is shorter than a predetermined threshold. The predetermined threshold can be arbitrarily set based on, for example, the types of the first virtual object and the second virtual object, the sizes thereof in the virtual space, and the like. Processing advances to step S316 if the distance between the second virtual object and the hand of the user is shorter than the predetermined threshold. Processing advances to steps S312 if the distance between the second virtual object and the hand of the user is the predetermined threshold or more. Even in the case where the distance between the second virtual object and the hand of the user is shorter than the predetermined threshold, the haptic feedback control circuit 27 may advance processing to step S312 if the second virtual objects is on the side of the back of the hand, not on the side of the palm.

In step S312, the haptic feedback control circuit 27 determines whether the second virtual object is relocated. By relocating the second virtual object, the haptic feedback control circuit 27 can allow the user to grasp or operate the second virtual object by hand.

Whether the second virtual object is relocated or not, when the distance between the second virtual object and the hand of the user is the predetermined threshold or more, can be set in advance. Whether the second virtual object is relocated or not may be set for each first virtual object, or for each second virtual object. For example, the haptic feedback control circuit 27 may determine that the second virtual object is relocated if the second virtual object exists in a range where the hand of the user can reach. Further, whether the second virtual object is relocated or not may be determined based on whether instruction by voice or instruction by gesture is received from the user. Processing advances to step S313 if the second virtual object is relocated. Processing advances to step S314 if the second virtual object is not relocated.

In step S313, based on the instruction from the haptic feedback control circuit 27, the display device 11 disposes the second virtual object at the position of the hand of the user. The haptic feedback control circuit 27 controls such that the position of the second virtual object and the position of the hand of the user (position where the motion of the user was detected) becomes a predetermined positional relationship. The predetermined positional relationship is a positional relationship by which the user can grasp or operate the second virtual object. The display device 11 updates the position information of the virtual object disposed in the real space coordinate system, and moves and redraws the second virtual object at a position where the user can grasp or operate the second virtual object. For example, the display device 11 may redraw the second virtual object at a position where the user can grasp the second virtual object using the palm side. By relocating the second virtual object, the user can start operation smoothly without searching the second virtual object, even if operation is performed at a position distant from the second virtual object.

In step S314, the haptic feedback control circuit 27 determines whether the second virtual object is remote-controlled or not. Whether the second virtual object is remote controlled, in the case where it is determined that the second virtual object is not relocated, can be set in advance. Whether the second virtual object is remote-controlled or not may be set in advance for the first virtual object or the second virtual object respectively. Further, whether the second virtual object is remote-controlled or not may be determined depending on whether an instruction by voice or an instruction by gesture is received from the user. Processing advances to step S315 if the second virtual object is remote-controlled. Processing advances to step S316 if the second virtual object is not remote-controlled.

In step S315, the haptic feedback control circuit 27 enables an interlocking function between the second virtual object and the hand of the user. In other words, the haptic feedback control circuit 27 controls to reproduce the tactile sensation with the second virtual object, even if the second virtual object is distant from the position of the hand of the user (position where the motion of the user was detected). By enabling the interlocking function, the haptic feedback control circuit 27 can exert action of the motion of the user (e.g. action to grasp or operate by hand) on the second virtual object, even if the second virtual object is not disposed at a position contacting the hand of the user. Instead of moving the second virtual object to the position of the hand, the haptic feedback control circuit 27 moves the position of the hand of the user (position where the motion of the user was detected) to a position where the second virtual object can be grasped or operated, and then the tactile sensation is reproduced. Thereby the haptic feedback control circuit 27 can interlock the second virtual object and the motion of the user.

In step S316, the haptic feedback control circuit 27 reproduces the tactile sensation with the second virtual object, and provides the reproduced tactile sensation to the hand of the user or the like that grasps or operates the second virtual object.

The haptic feedback control circuit 27 moves the position of the second virtual object or a position where the motion of the user was detected (position of the hand), and then reproduces the tactile sensation with the second virtual object, thereby smooth operation can be implemented even if the position of the second virtual object and the position where the motion of the user was detected are distanced. The haptic feedback control circuit 27 relocates the second virtual object or enables the interlocking function based on the distance between the position of the second virtual object and the position where the motion of the user was detected, whereby the tactile sensation with the second virtual object can be provided to the user appropriately.

FIG. 9B is a flow chart exemplifying processing to set the weighting of the tactile sensation and priority (processing performance) of the processing of the tactile sensation based on the distance between the second virtual object and the line-of-sight position. In step S321, the haptic feedback control circuit 27 acquires the distance between the line-of-sight position of the user and the second virtual object.

In step S322, the haptic feedback control circuit 27 determines whether or not a weighting factor of the tactile sensation is set based on the distance acquired in step S321. Whether or not the weighting factor of the tactile sensation is set may be set in advance, or may be set or changed by the user. Processing advances to step S323 if the weighting factor of the tactile sensation is set. Processing advances to step S324 if the weighting factor of the tactile sensation is not set.

In step S323, the haptic feedback control circuit 27 sets the weighting factor of the tactile sensation with the second virtual object, based on the distance between the line-of-sight position of the user and the second virtual object. The haptic feedback control circuit 27 sets the weighting factor of the tactile sensation to be larger as the distance (distance between the line-of-sight position of the user and the second virtual object) is longer in the range of the distance to set the weighting factor.

In the case where an object existing outside the visual field is detected by contact, the user may not notice the contact if the intensity of the tactile sensation is weak. Therefore the haptic feedback control circuit 27 sets the weighting factor such that the intensity of the tactile sensation with the second virtual object is stronger as the distance between the line-of-sight position and the second virtual object is longer. Thereby the user can notice the contact with the second virtual object more easily.

The value of the weighting factor and the range of the distance to set the weighting factor can be set arbitrarily. The value of the weighting factor can be set such that the distance and the weighting factor have a positive correlation within the range to set the weighting factor.

In step S324, the haptic feedback control circuit 27 determines whether or not priority (processing performance) of the processing to reproduce the tactile sensation is set, based on the distance acquired in step S321. Whether or not the priority of the processing to reproduce the tactile sensation is set may be set in advance, or set or changed by the user. Processing advances to step S325 if the priority of the processing to reproduce the tactile sensation is set. Processing advances to step S326 if the priority of the processing to reproduce the tactile sensation is not set.

In step S325, the haptic feedback control circuit 27 sets the priority of the processing to reproduce the tactile sensation with the second virtual object, based on the distance between the line-of-sight position of the user and the second virtual object. The haptic feedback control circuit 27 sets higher priority to reproduce the tactile sensation as the distance (distance between the line-of-sight position of the user and the second virtual object) is longer in the range of the distance to set the priority of processing.

In the case where the object existing outside the visual field is detected by contact, a drop in gain and a time lag when the tactile sensation is reproduced are not desirable. Therefore the haptic feedback control circuit 27 increases the priority of the processing to reproduce the tactile sensation with the second virtual object as the distance between the line-of-sight position and the second virtual object is longer. Thereby the user can notice the contact with the second virtual object more easily.

The priority of the processing can be changed by changing the occupancy rate of the CPU 2, the priority of the task to be processing, and the priority of access to the memory unit 3, for example. The range of the distance to set the priority of the processing can be set arbitrarily. The priority of the processing can be set such that the distance and the level of priority have a positive correlation within a range of the distance to set the priority of the processing. Further, as long as influence on the operational feeling of the head-mounted display 100 or the like is not affected, the priority of processing of other modules performed in parallel may be lowered, so that priority of the processing to reproduce the tactile sensation can be increased.

In step S326, the haptic feedback control circuit 27 reproduces the tactile sensation with the second virtual object, and provides the reproduced tactile sensation to the hand of the user or the like that grasps or operates the second virtual object.

By setting the weighting of the tactile sensation based on the distance between the line-of-sight position of the user and the second virtual object, the user can notice the contact with the second virtual object, located at a position distant from the line-of-sight position, more easily. Further, by setting the priority of processing to reproduce the tactile sensation based on the distance between the line-of-sight position of the user and the second virtual object, the user can accurately detect the tactile sensation with the second virtual object located at a position distant from the line-of-sight position. According to the processing indicated in FIG. 9B, the user can smoothly grasp or operate the virtual object, even if this virtual object is outside the range of the visual field.

The processing steps in FIGS. 9A and 9B are examples, and the sequence of each step and the processing method may be changed when necessary as long as similar results can be obtained.

According to the head-mounted display 100 of Embodiment 3 described above, the user can smoothly grasp or operate an intended virtual object, even if the second virtual object is distant from the position of the hand of the user (position where the motion of the user was detected) or the line-of-sight position. Further, even in the case where the user attempts to grasp a virtual object without viewing it (without directing the line-of-sight), the head-mounted display 100 can improve selectivity of the virtual object that the user attempts to grasp or operate. Furthermore, the head-mounted display 100 can improve the operational feeling of the virtual object by providing the user tactile sensation with the virtual object that the user attempts to grasp or operate without viewing it.

In Embodiment 3, the distance between the line-of-sight position of the user and the second virtual object was described, but the weighting and the priority of processing may be set based on the distance between the first virtual object and the second virtual object, instead of the distance with the line-of-sight position.

According to the present invention, a head-mounted display, that can accurately select a virtual object that the user attempts to grasp or operate and provide the user tactile sensation with the selected virtual object, can be provided.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

Preferred embodiments of the present invention have been described, but the present invention is not limited to these embodiments, and various modifications and changes are possible within the scope of the invention. The embodiments described above may be partially combined with each other when necessary.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-119770, filed on Jul. 24, 2023, which is hereby incorporated by reference herein in its entirety.

What is claimed is:

1. A head-mounted display comprising one or more processors and/or circuitry configured to:

execute acquisition processing to acquire information on motion of a user; and execute control processing to control to reproduce tactile sensation with a second virtual object, which is a virtual operation body that exerts action on a first virtual object specified by the user, and is selected based on the information on the motion of the user, wherein in the control processing, it is controlled such that a higher priority is assigned to processing to reproduce the tactile sensation with the second virtual object as a distance between a line-of-sight position of the user and the second virtual object is longer, and the tactile sensation with the second virtual object is reproduced thereby.

2. The head-mounted display according to claim 1, wherein the first virtual object is specified by a line-of-sight of the user.

3. The head-mounted display according to claim 2, wherein the one or more processors and/or the circuitry configured to further execute selection processing to select the first virtual object, and wherein in the selection processing, the first virtual object is selected based on time during which the line-of-sight of the user is directed.

4. The head-mounted display according to claim 2, wherein the one or more processors and/or the circuitry configured to further execute selection processing to select the first virtual object, and wherein in the selection processing, the first virtual object is selected based on a number of times the line-of-sight of the user is directed.

5. The head-mounted display according to claim 4, wherein the first virtual object is a virtual object of which a number of times the line-of-sight of the user is directed is highest within a predetermined time.

6. The head-mounted display according to claim 4, wherein the first virtual object is a virtual object of which a number of times the line-of-sight of the user is directed reached a predetermined number of times.

7. The head-mounted display according to claim 4, wherein the first virtual object is a virtual object of which a number of times the line-of-sight of the user is directed at a time of receiving an instruction from the user is highest.

8. The head-mounted display according to claim 1, wherein the first virtual object is specified by a hand of the user, a finger of the user or a controller to operate the head-mounted display.

9. The head-mounted display according to claim 1, wherein in the control processing, it is controlled such that a position of the second virtual object and a position at which the motion of the user was detected have a predetermined positional relationship.

10. The head-mounted display according to claim 1, wherein in the control processing, it is controlled such that the tactile sensation with the second virtual object is reproduced even if the second virtual object is distant from a position where the motion of the user was detected.

11. The head-mounted display according to claim 1, wherein in the control processing, it is controlled such that weighting is performed so that intensity of the tactile sensation with the second virtual object is stronger than intensity of tactile sensation with other virtual objects, and the tactile sensation with the second virtual object is reproduced thereby.

12. The head-mounted display according to claim 1, wherein in the control processing, it is controlled such that weighting is performed so that intensity of the tactile sensation with the second virtual object becomes stronger as a distance between a line-of-sight position of the user and the second virtual object is longer, and the tactile sensation with the second virtual object is reproduced thereby.

13. The head-mounted display according to claim 1, wherein in the control processing, it is controlled such that weighting is performed so that intensity of the tactile sensation with the second virtual object becomes stronger as a distance between the first virtual object and the second virtual object is longer, and the tactile sensation with the second virtual object is reproduced thereby.

14. A head-mounted display comprising one or more processors and/or circuitry configured to:

execute acquisition processing to acquire information on motion of a user; and execute control processing to control to reproduce tactile sensation with a second virtual object, which is a virtual operation body that exerts action on a first virtual object specified by the user, and is selected based on the information on the motion of the user, wherein in the control processing, it is controlled such that a higher priority is assigned to processing to reproduce the tactile sensation with the second virtual object as a distance between the first virtual object and the second virtual object is longer, and the tactile sensation with the second virtual object is reproduced thereby.

15. A method for controlling a head-mounted display, comprising steps of:

acquiring information on motion of a user; and controlling tactile sensation with a second virtual object, which is a virtual operation body that exerts action on a first virtual object specified by the user, and is selected based on the information on the motion of the user, wherein in the controlling, it is controlled such that a higher priority is assigned to processing to reproduce the tactile sensation with the second virtual object as a distance between a line-of-sight position of the user and the second virtual object is longer, and the tactile sensation with the second virtual object is reproduced thereby.

16. A non-transitory computer readable medium that stores a program, wherein the program causes a computer to execute the method according to claim 15.

* * * * *